United States Patent [19]

Oliver

[11] Patent Number: 4,673,148
[45] Date of Patent: Jun. 16, 1987

[54] HOLDER FOR A HAIR DRYER

[76] Inventor: James A. Oliver, 101 Federal St., Sandston, Va. 23150

[21] Appl. No.: 870,770

[22] Filed: Jun. 2, 1986

[51] Int. Cl.⁴ .............................................. E04G 3/00
[52] U.S. Cl. ................................. 248/293; 248/309.1; 248/315
[58] Field of Search ..................... 248/293, 309.1, 314, 248/315, 312, 359 R, 359 H, 311.2, 311.3

[56] References Cited

U.S. PATENT DOCUMENTS

| | | | |
|---|---|---|---|
| 1,565,118 | 12/1925 | Stugard | 248/293 |
| 3,991,961 | 11/1976 | Platzer | 248/315 X |
| 4,191,350 | 3/1980 | Ormond | 248/293 |
| 4,219,178 | 8/1980 | Assion | 248/314 |
| 4,225,106 | 9/1980 | Eplan | 240/314 X |

Primary Examiner—Ramon O. Ramirez
Attorney, Agent, or Firm—Norman B. Rainer

[57] ABSTRACT

A holder device adapted to be affixed to a vertical wall accommodates an electric hair dryer having an elongated barrel and permits easy insertion of the dryer into and removal from the holder. The holder has a mounting bracket and an arm pivotably engaged by the bracket and adapted to be easily moved between a vertically pendant position and a horizontally disposed position. When the arm is in its horizontal position with the dryer engaged therein, the dryer may be utilized in a hands-free mode.

4 Claims, 6 Drawing Figures

HOLDER FOR A HAIR DRYER

BACKGROUND OF THE INVENTION

This invention relates to a holder for a hair dryer, and more particularly concerns a device for releasibly holding a hair dryer in adjustable positions to secure more versatile utilization thereof.

Many designs of relatively small, lightweight hand-held electrical hair dryers are currently in widespread use. One of the most prevalent styles of hair dryer is the gun type wherein the dryer has a hand grip portion and an elongated barrel portion out of which hot air is forced. Other styles of hair dryer may also have an elongated barrel portion.

In order to use the hand held dryers, the user normally holds the dryer in one hand adjacent to his or her head so that the hot air exiting from the outlet of the dryer impinges upon the user's hair. This mode of operation presents several drawbacks. For example, the user's arm may become tired after holding the dryer up for a sustained period of time. Moreover, since the user has to hold the dryer in one hand adjacent his or her head, this severely limits the user's ability to style his or her hair during the drying operation.

A wall mounted holder device for a hair dryer is disclosed in U.S. Pat. No. 4,225,106 to Eplan. Although the Eplan holder is adjustable within a horizontal plane, it does not enable the user to easily and quickly remove the hair dryer for hand-held manipulative use.

Another wall-mounted holder for a hair dryer is disclosed in U.S. Pat. No. 4,461,439 to Rose. The Rose holder is versatile in its directional adjustability but requires that a bulky component be affixed to the dryer, thereby impairing the manipulation of the dryer in its hand-held mode of use. The Rose holder is of relatively complex construction and susceptible to damage in the course of long term use.

It is accordingly an object of the present invention to provide a holder for a hair dryer which permits use of the hair dryer while mounted in said holder and permits easy removal of the hair dryer for hand-held use.

It is another object of this invention to provide a holder as in the foregoing object wherein, in the hand-held mode of use, no component of the holder remains attached to the dryer.

It is a further object of the present invention to provide a holder of the aforesaid nature which enables the user to easily and single handedly remove the dryer from the holder and return it thereto.

It is still another object of this invention to provide a holder of the aforesaid nature of rugged and durable construction amenable to low cost manufacture.

These objects and other objects and advantages of the invention will be apparent from the following description.

SUMMARY OF THE INVENTION

The above and other beneficial objects and advantages are accomplished in accordance with the present invention by a holder for a hair dryer having an elongated barrel comprising:

(a) a bracket of monolithic construction having a base panel intended to be vertically disposed and having front and rear surfaces, paired side panels emerging perpendicularly from the front surface of said base panel in parallel relationship and terminating in forward extremities, a horizontally elongated slot having a straight bottom disposed in each panel in substantially parallel orientation, and an upwardly opening hook portion disposed within the forward extremity of each side panel, said hook portions having a rounded bottom tangentially aligned with the bottom of said slots, (b) an elongated rigid arm having a proximal extremity, distal extremity, upper, lower and side surfaces, and first and second pairs of pivot studs perpendicularly emergent from each side surface adjacent said proximal extremity, said first studs penetratively and slideably engaging the slots in said side panels, and said second studs being configured to fit within said hook portions when said first studs are at the rearwardmost extremities of said slots, (c) a circular cylindrical band defined by a rigid sidewall pivotably affixed to the distal extremity of said arm and adapted to rotate in a path above the upper surface of the arm and parallel to the axis of elongation thereof, and (d) threaded locking means which radially penetrate the sidewall of said band and manually operable from the exterior of said sidewall, whereby (e) a hair dryer can be held by the holder by insertion of the barrel of the dryer into said band, and (f) said arm can be swung in a vertical path between pendant vertical and horizontally locked positions.

In preferred embodiments of the holder, the base panel of the bracket member is flat and adapted to be affixed to a flat vertical wall surface. Mounting holes are preferably disposed within said base panel. The distal extremity of the arm is preferably provided with a portion upraised above its upper surface, thereby displacing the band and the dryer held therein a convenient distance from the upper surface of the arm.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENTS

Figures 1, 2:
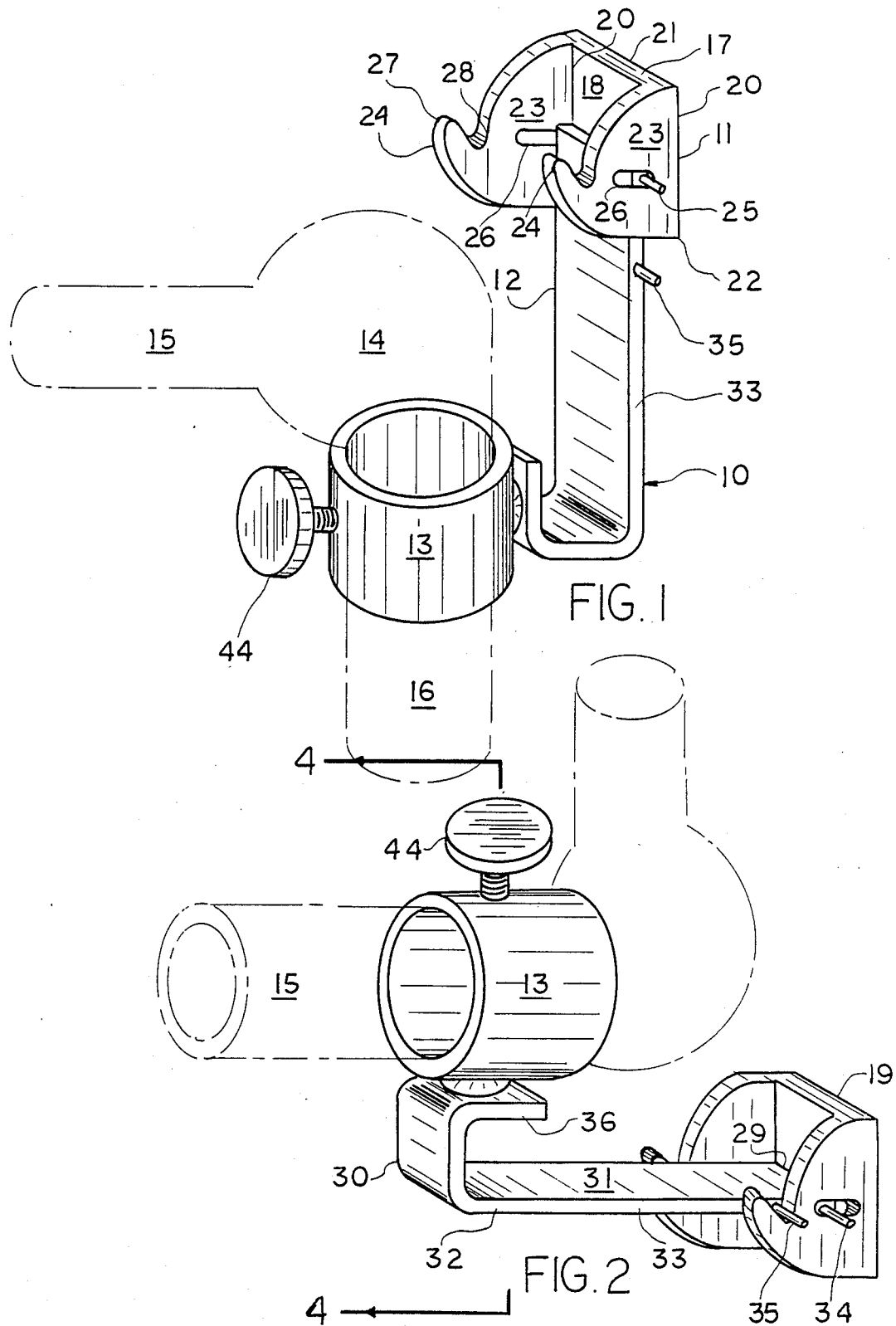
FIG. 1 is a perspective side view of an embodiment of holder device of this invention shown in operative association with a hair dryer and with the arm component in its pendant vertical position.
FIG. 2 is a perspective side view of the embodiment of FIG. 1 shown with said arm in its horizontally locked position.

Referring to FIGS. 1 and 2, an embodiment of the holder 10 of this invention comprised of bracket 11, arm 12 and band 13 is shown in operative association with a hair dryer 14 having a handle portion 15 and barrel portion 16.

Bracket 11 is fabricated of a single piece of metal or engineering grade plastic and is comprised of base panel 17 of generally rectangular configuration having front surface 18, rear surface 19, opposed side extremities 20, upper edge 21 and lower edge 22. Paired side panels 23 emerge perpendicularly from front surface 18 at side extremities 20. The panels are disposed in parallel relationship and terminate in forward extremities 24. A horizontally elongated slot 25 having straight bottom 26 is disposed in each panel, said slots being in parallel alignment. An upwardly opening hook portion 27 is disposed within the forward extremities 24 of said side panels. Each hook portion has a rounded bottom 28 tangentially aligned with the bottom 26 of said slots.

Figure 3:
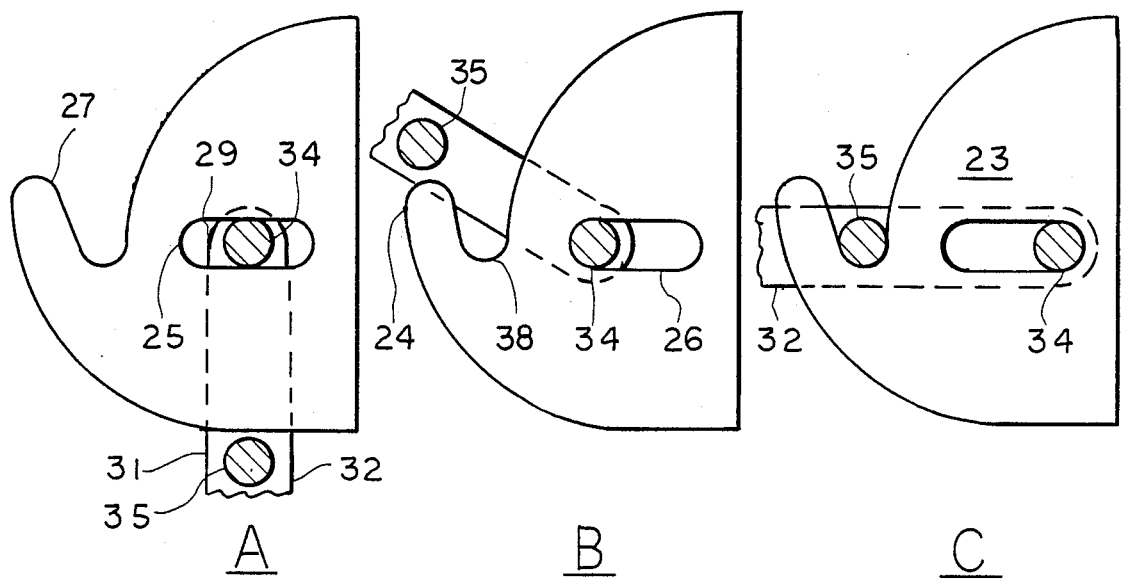
FIG. 3 is an enlarged fragmentary side view showing the movement of the arm with respect to the bracket component.

Arm 12 is an elongated rigid member having a proximal extremity 29, distal extremity 30, upper surface 31, lower surface 32, and opposed side surfaces 33. Paired first and second pivot studs 34 and 35, respectively, are perpendicularly emergent in coaxial alignment from each side surface 33 adjacent said proximal extremity. The first studs penetratively and slideably engage slots 25. Second studs 35 are positioned and dimensioned in a manner to fit within said hook portions when said first studs are at the rearwardmost extremities of the slots. Such function of the studs is more clearly shown in FIG. 3, wherein FIG. 3A shows the pendant position of the arm, FIG. 3C shows the horizontally locked position of the arm, and FIG. 3B illustrates the transient configuration of the components during the change of position of the arm. The distal extremity of the arm is bent in a manner to provide shelf 36 upraised from upper surface 31.

Figure 4:
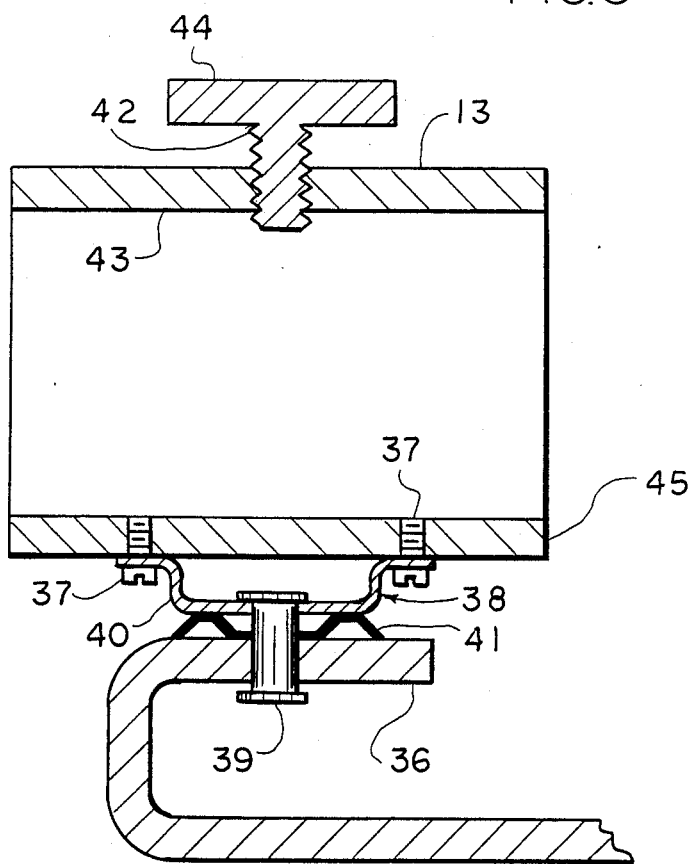
FIG. 4 is an enlarged sectional view taken along the line 4—4 of FIG. 2.

A circular cylindrical band 13 defined by rigid sidewall 45 is affixed by pivot assembly 38 to shelf 36 of said arm. The pivot assembly, as shown most clearly in FIG. 4, is comprised of pivot pin 39, mounting harness 40 fastened by bolts 37 to the exterior of sidewall 45, and friction washer 41 disposed upon pin 39 between said harness and shelf 36. By virtue of said pivot assembly, band 13 can be turned in a manner whereby the axis of the band is rotated in a plane parallel to upper surface 31 of the arm.

A threaded locking bolt 42 threadably penetrates the sidewall 43 of the band in a radial direction relative to the center axis of the band. A turning knob 44 is positioned upon the bolt exteriorly to sidewall 43. Said locking bolt may be positioned at any convenient location about the circumference of the sidewall.

By virtue of the aforesaid construction, the barrel of the dryer may be inserted into said band. When the arm is in its pendant, vertical position, the band serves as a holster for the dryer, permitting rapid one hand removal and re-insertion of the dryer. When the arm is in its locked horizontal position and locking bolt 42 is tightened, the holder securely positions the dryer at a height where it may be utilized in its usual hair-drying function, or may be used as a room heater.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A holder for an electric hair dryer having an elongated barrel, said holder comprising:
   (a) a bracket comprised of a base panel intended to be vertically disposed and having front and rear surfaces, paired side panels emerging perpendicularly from the front surface of said base panel in parallel relationship and terminating in forward extremities, a horizontally elongated slot having a straight bottom disposed in each panel in substantially parallel orientation, and an upwardly opening hook portion disposed within the forward extremity of each side panel, said hook portions having a rounded bottom tangentially aligned with the bottom of said slots,
   (b) an elongated rigid arm having a proximal extremity, a distal extremity, upper, lower and side surfaces, and first and second pairs of pivot studs perpendicularly emergent from each side surface adjacent said proximal extremity, said first studs penetratively and slideably engaging the slots in said side panels, and said second studs being configured to fit within said hook portions when said first studs are at the rearwardmost extremities of said slots,
   (c) a circular cylindrical band defined by a rigid sidewall pivotably affixed to the distal extremity of said arm and configured to rotate in a path above the upper surface of the arm and parallel to the axis of elongation thereof, and
   (d) threaded locking means which radially penetrate the sidewall of said band and manually operable from the exterior of said sidewall, whereby
   (e) a hair dryer can be held by the insertion of the barrel of the dryer into said band, and
   (f) said arm can be swung in a vertical path between pendant vertical and horizontally locked positions.

2. The holder of claim 1 wherein said bracket is of monolithic construction.

3. The holder of claim 1 wherein the base panel of said bracket member is sufficiently flat to permit mounting upon a flat vertical wall surface.

4. The holder of claim 1 wherein the distal extremity of the arm is provided with a portion upraised above its upper surface, and said band is mounted upon said upraised portion, whereby said band is displaced a convenient distance from the upper surface of the arm.

* * * * *